(12) United States Patent
Cabos

(10) Patent No.: US 9,037,169 B2
(45) Date of Patent: May 19, 2015

(54) SMS COMMUNICATION TO AND FROM MESSAGING DEVICES IN AN AIRCRAFT

(75) Inventor: Ralf Cabos, Singapore (SG)

(73) Assignee: Flight Focus Pte. Ltd., Singapore (SG)

( * ) Notice: Subject to any disclaimer, the term of this patent is extended or adjusted under 35 U.S.C. 154(b) by 429 days.

(21) Appl. No.: 13/640,705

(22) PCT Filed: Apr. 12, 2011

(86) PCT No.: PCT/IB2011/051556
§ 371 (c)(1),
(2), (4) Date: Oct. 11, 2012

(87) PCT Pub. No.: WO2011/128833
PCT Pub. Date: Oct. 20, 2011

(65) Prior Publication Data
US 2013/0029701 A1    Jan. 31, 2013

(30) Foreign Application Priority Data

Apr. 12, 2010   (WO) .................. PCT/IB2010/051560

(51) Int. Cl.
| H04W 4/12 | (2009.01) |
| H04W 4/14 | (2009.01) |
| H04B 7/185 | (2006.01) |
| H04L 29/08 | (2006.01) |

(Continued)

(52) U.S. Cl.
CPC ............. *H04B 7/18502* (2013.01); *H04W 4/14* (2013.01); *H04W 84/005* (2013.01); *H04W 84/06* (2013.01); *H04L 67/12* (2013.01); *H04L 51/38* (2013.01); *H04L 51/066* (2013.01)

(58) Field of Classification Search
CPC ......... H04W 84/06; H04W 4/12; H04W 8/26; H04B 7/18506; H04B 7/18508; H04B 7/18502; H01Q 1/246; H01Q 1/28; H01Q 1/32; H01Q 1/007; H04L 51/066; H04L 51/38; H04L 12/5895; H04L 63/30
See application file for complete search history.

(56) References Cited

U.S. PATENT DOCUMENTS

| 3,657,476 A | 4/1972 | Aiken |
| 4,405,829 A | 9/1983 | Rivest et al. |

(Continued)

FOREIGN PATENT DOCUMENTS

| WO | 2011128832 | 10/2011 |
| WO | 2011128833 | 10/2011 |

OTHER PUBLICATIONS

Cabos; International Preliminary Report on Patentability for serial No. PCT/IB2011/051555, filed Apr. 12, 2011, mailed Oct. 23, 2012, 66 pgs.

(Continued)

*Primary Examiner* — Matthew Sams
(74) *Attorney, Agent, or Firm* — Taylor English Duma LLP

(57) ABSTRACT

The application discloses a message transmission device for transmitting an SMS message of a mobile device from an aircraft to a ground system. The device comprising an onboard antenna which is connected to a base transceiver station for receiving the SMS message from the mobile device, means for forwarding the message to a mobile switching centre onboard the aircraft and means for emulating status messages. Furthermore, the message transmission device comprises means for transferring the status messages to the mobile device, a splitter for splitting the message into data packets and means for transmitting the data packets to the ground system.

8 Claims, 10 Drawing Sheets

Figure 1:
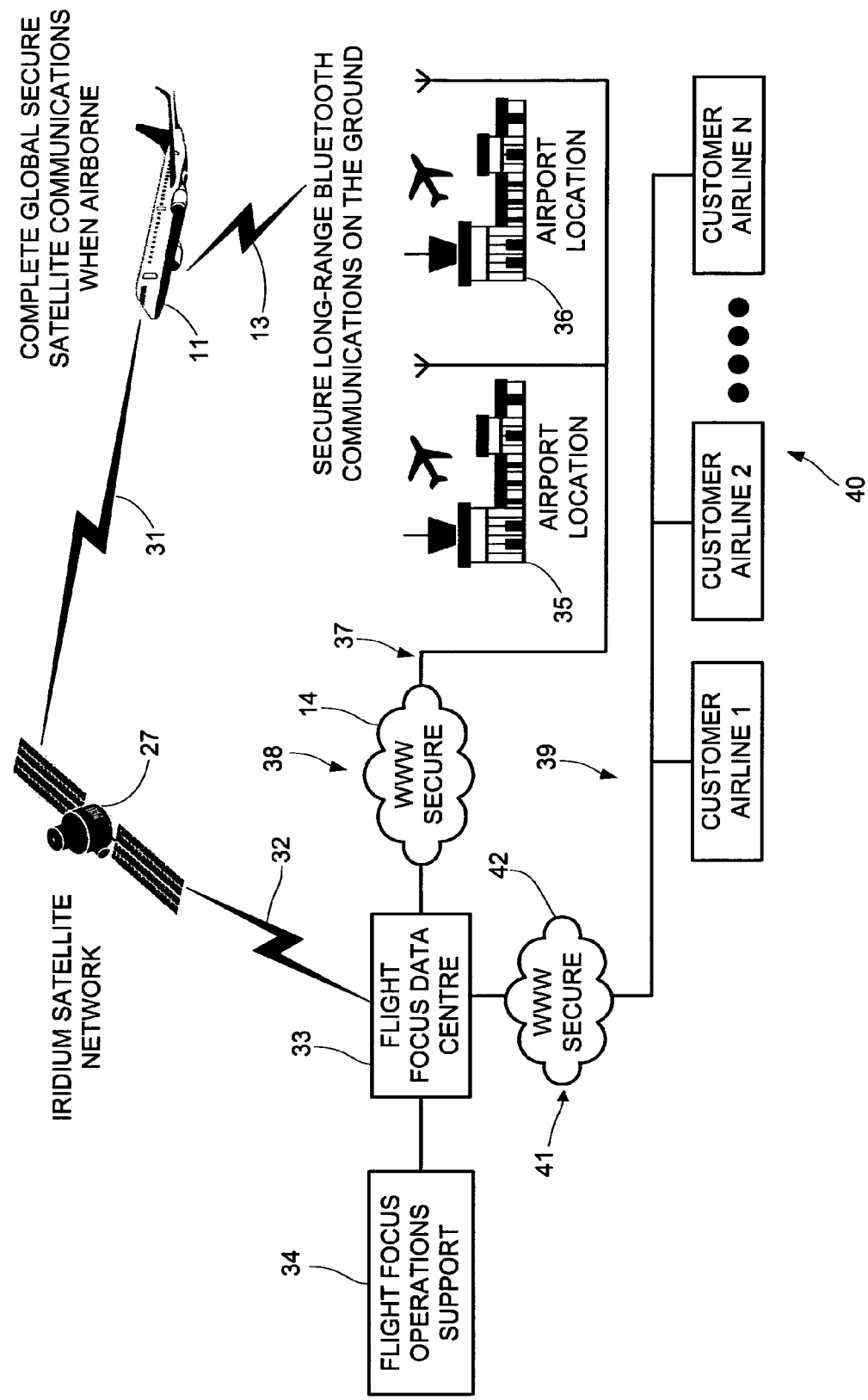

(51) Int. Cl.
*H04L 12/58* (2006.01)
*H04W 84/00* (2009.01)
*H04W 84/06* (2009.01)

(56) References Cited

U.S. PATENT DOCUMENTS

| | | | |
|---|---|---|---|
| 6,788,935 B1* | 9/2004 | McKenna et al. | 455/431 |
| 6,816,762 B2 | 11/2004 | Hensey et al. | |
| 7,020,708 B2 | 3/2006 | Nelson et al. | |
| 7,113,780 B2* | 9/2006 | McKenna et al. | 455/431 |
| 7,454,203 B2* | 11/2008 | Levitan | 455/431 |
| 7,630,710 B2 | 12/2009 | Kauffman | |
| 2003/0027550 A1 | 2/2003 | Rochwell | |
| 2003/0032426 A1* | 2/2003 | Gilbert et al. | 455/427 |
| 2003/0068044 A1 | 4/2003 | Nikolsky | |
| 2006/0008087 A1 | 1/2006 | Olive | |
| 2007/0021117 A1 | 1/2007 | McKenna et al. | |
| 2007/0028089 A1 | 2/2007 | Yukawa et al. | |
| 2007/0214583 A1 | 9/2007 | Hutton | |
| 2008/0102824 A1 | 5/2008 | Kauffman | |
| 2008/0182573 A1 | 7/2008 | Lauer et al. | |
| 2008/0214188 A1 | 9/2008 | Galy et al. | |
| 2008/0240029 A1* | 10/2008 | Lynch et al. | 370/329 |
| 2008/0305762 A1* | 12/2008 | Malosh | 455/404.1 |
| 2009/0010200 A1* | 1/2009 | Lauer et al. | 370/316 |
| 2009/0274097 A1* | 11/2009 | Budinger et al. | 370/328 |
| 2009/0282469 A1* | 11/2009 | Lynch et al. | 726/11 |
| 2009/0285153 A1* | 11/2009 | Khan et al. | 370/316 |
| 2010/0048202 A1* | 2/2010 | Beacham et al. | 455/431 |
| 2011/0116373 A1* | 5/2011 | Lauer | 370/232 |
| 2013/0028174 A1* | 1/2013 | Cabos | 370/316 |
| 2013/0029701 A1* | 1/2013 | Cabos | 455/466 |

OTHER PUBLICATIONS

Cabos; International Preliminary Report on Patentability for serial No. PCT/IB2011/051556, filed Apr. 12, 2011, mailed Oct. 23, 2012; 26 pgs.

Cabos, Ralf; U.S. Patent Application entitled: Secure Aircraft Data Channel Communication for Aircraft Operations, having U.S. Appl. No. 13/084,576, filed Apr. 12, 2011, 61 pgs.

Cabos, Ralf; Restriction Requirement for U.S. Appl. No. 13/084,576, filed Apr. 12, 2011, mailed Nov. 28, 2012, 6 pgs.

Cabos, Ralf; Non-Final Office Action for U.S. Appl. No. 13/084,576, filed Apr. 12, 2011, mailed Aug. 22, 2013, 9 pgs.

Cabos, Ralf; Final Office Action for U.S. Appl. No. 13/084,576, filed on Apr. 12, 2011, mailed Dec. 5, 2013, 10 pgs.

Cabos; International Search Report and Written Opinion for serial No. PCT/IB2011/051556, filed Apr. 12, 2011, mailed Feb. 6, 2012; 3 pages.

Cabos; International Search Report and Written Opinion for serial No. PCT/IB11/051555, filed Apr. 12, 2011, mailed Feb. 6, 2012; 16 pgs.

Cabos; U.S. Patent Application entitled: Use of a Meta Language for Processing of Aviation Related Messages having U.S. Appl. No. 13/640,702, filed Oct. 11, 2012, 108 pgs.

* cited by examiner

SMS COMMUNICATION TO AND FROM MESSAGING DEVICES IN AN AIRCRAFT

During a flight of an aircraft, messages such as notices to airmen, weather data, pilot reports, engine exceedance events are exchanged between the aircraft and a ground station. Text messages are also used by pilots to notify their destination of any delays, maintenance issues, or special requirements on arrival such as catering for wheelchair passengers or for ordering further services such as ordering fuel.

The standard equipment on the aircraft commonly uses the ACARS, or 'Aircraft Communication Addressing and Reporting System', which is a digital data link system which is used for the transmission of text messages between aircraft and ground stations, using telex formats. The aim is to reduce the crew workload by saving on the amount of voice transmissions the pilots would have to make. A data link interface is put in place in the cockpit, between the ACARS unit and the Flight Management System (FMS, the on-board computer which controls navigation on modern aircrafts). A network of 'Remote Ground Stations' or RGSs, ensures that the aircraft can communicate with their airline operations base, or ATC, from almost anywhere in the world. Communications are commonly conducted via VHF, but when the aircraft is outside of VHF range, there are two other options; 'SATCOM', which is ACARS sent via a satellite link that provides worldwide coverage with the exception of the poles, and 'HF data link' that provides a worldwide coverage, including the polar regions. HF data link is a much cheaper option than SATCOM, but far less reliable and is subject to fade conditions and signal loss with solar flare activity.

Instead of using the ACARS protocol, it is also possible to buy bandwidth on a satellite of a global satellite network and to transmit the text messages via the satellites. This option allows a manufacturer of aircraft equipment to use a proprietary protocol. The forwarding of the messages from and to the aircraft is handled by the provider of the global satellite network. Satellite network providers, such as Iridium, offer a short burst data (SBD) service for the transmission of text messages. This service works similar to an e-mail service. The cost of the SBD service is usually calculated on a byte and not on a time basis. Therefore, it is generally less expensive for sending text messages than one-way satellite watch circle services. Depending on the type of transceiver used, the maximum possible length of a text messages is currently between about 300 and 2000 bytes.

It is an object of the current application to provide an improved method and system for sending and receiving SMS messages from and to an aircraft.

Figure 2:
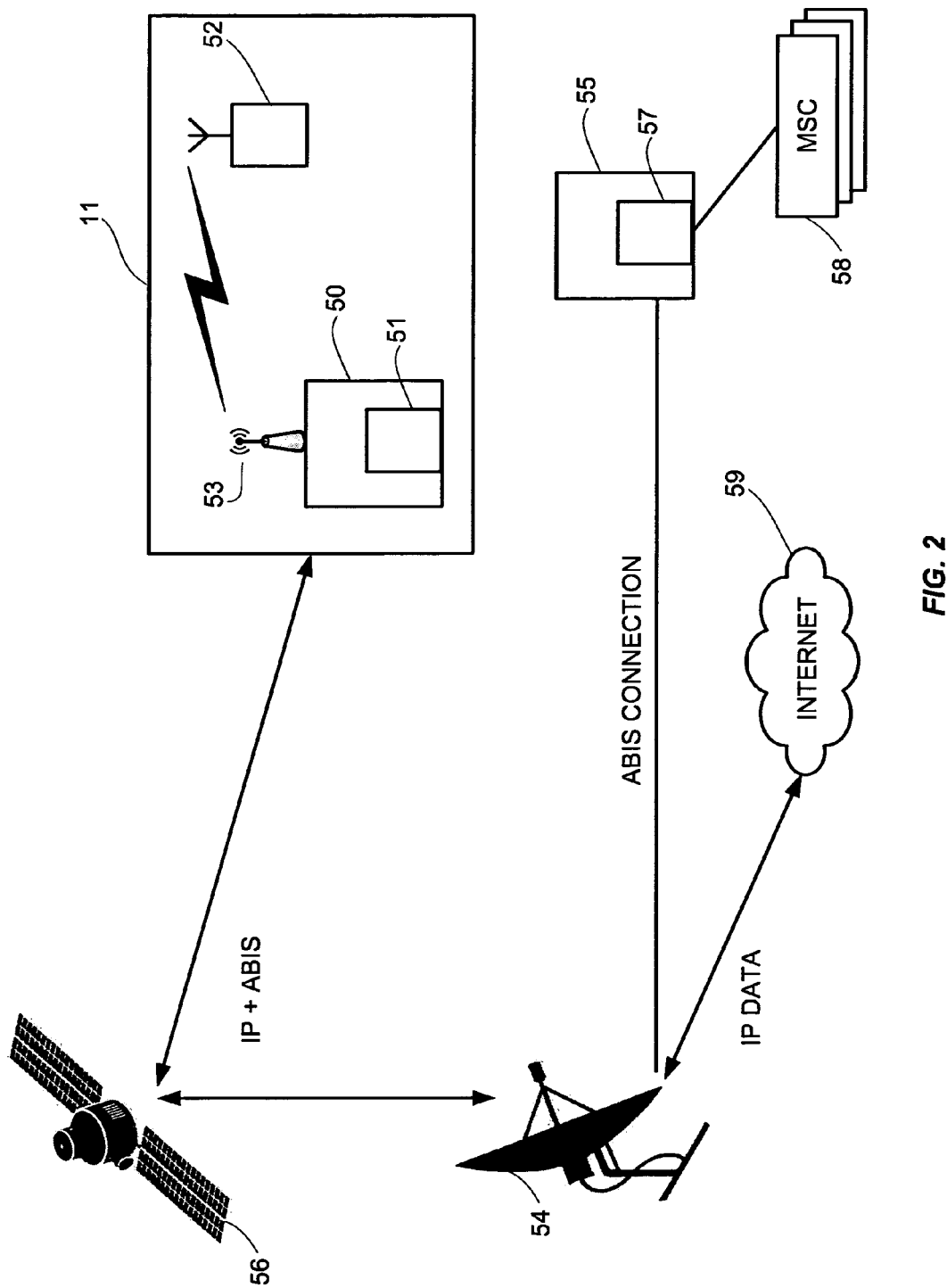
Figure 3:
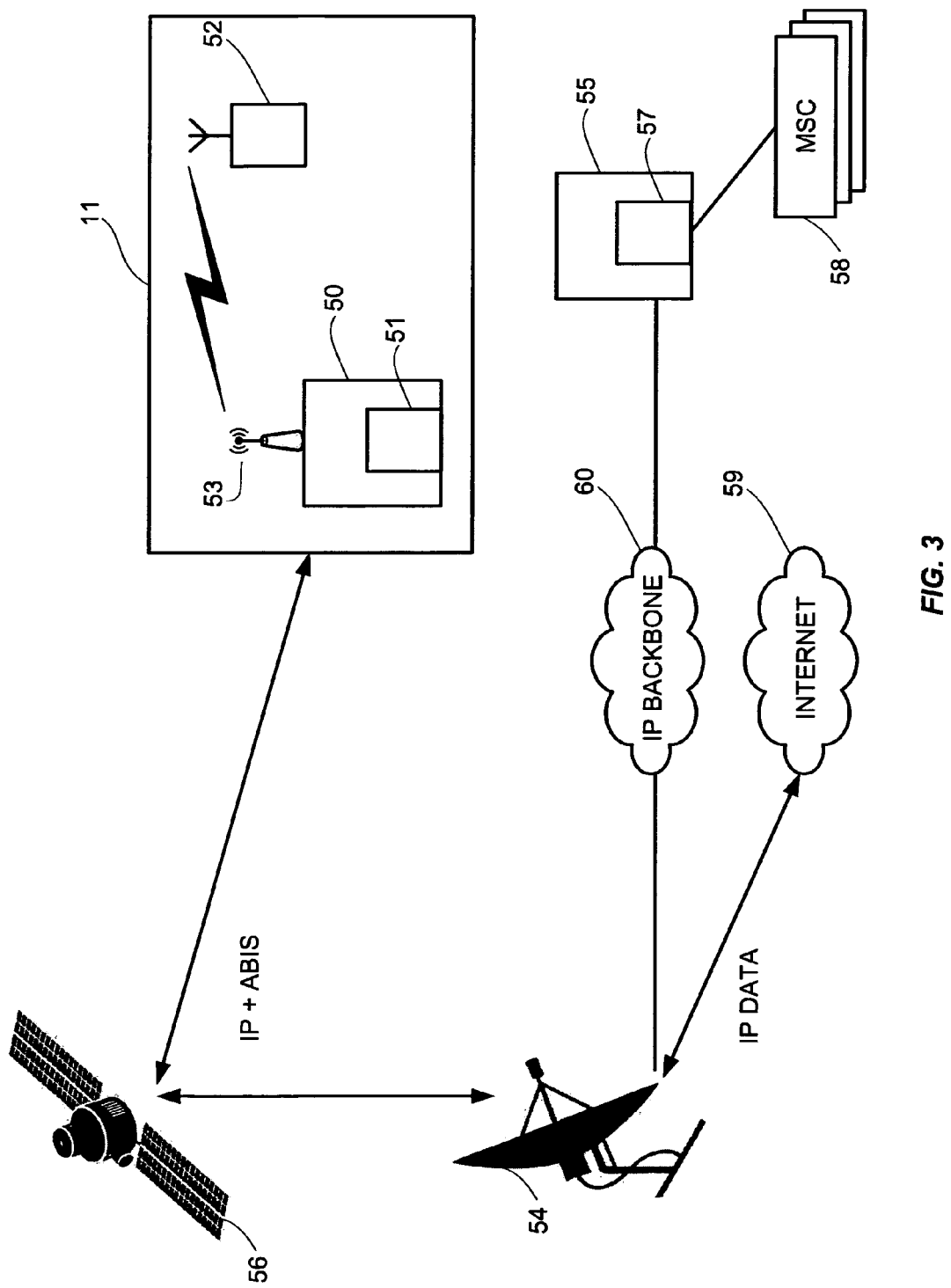
Figure 4:
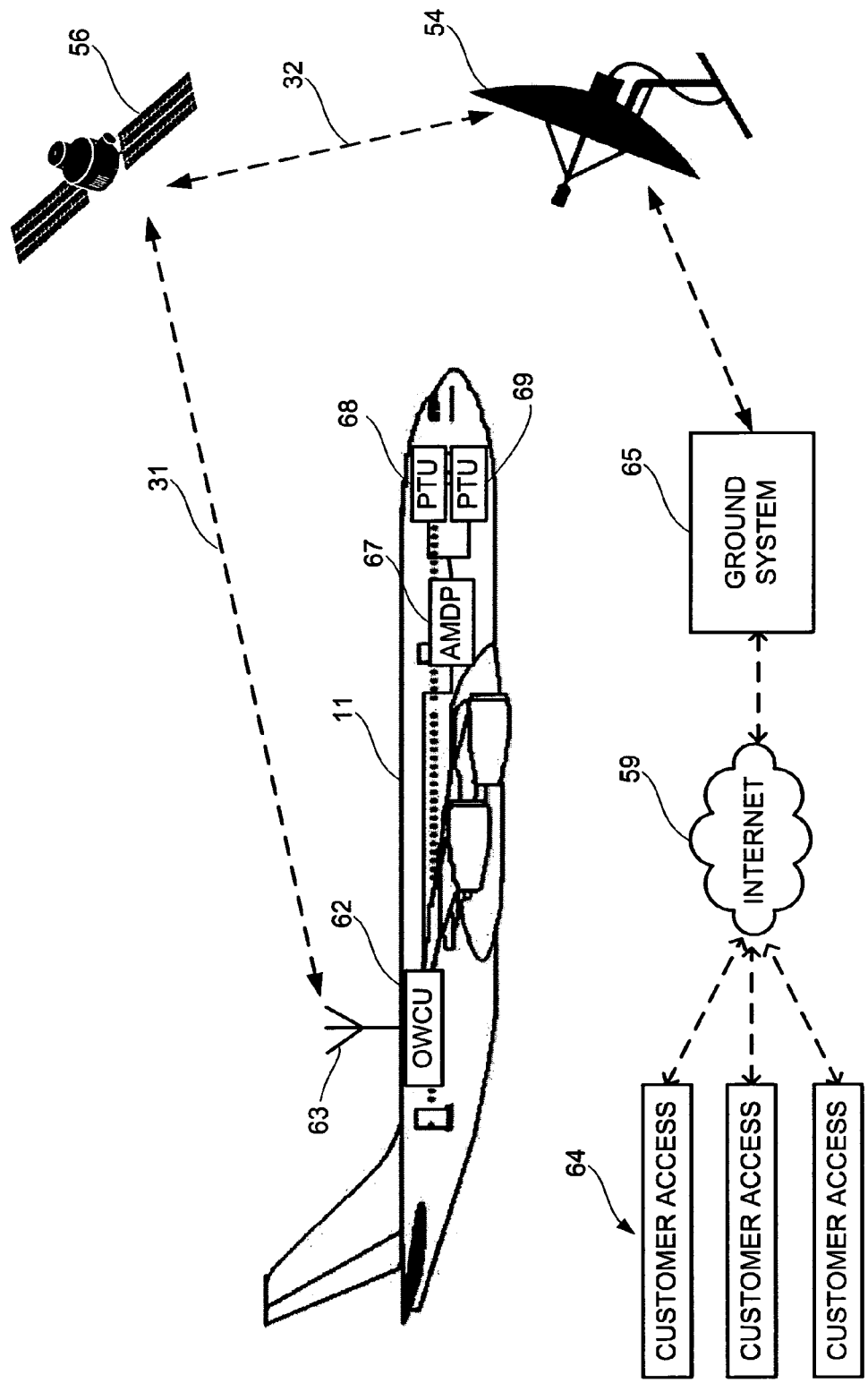
Figure 5:
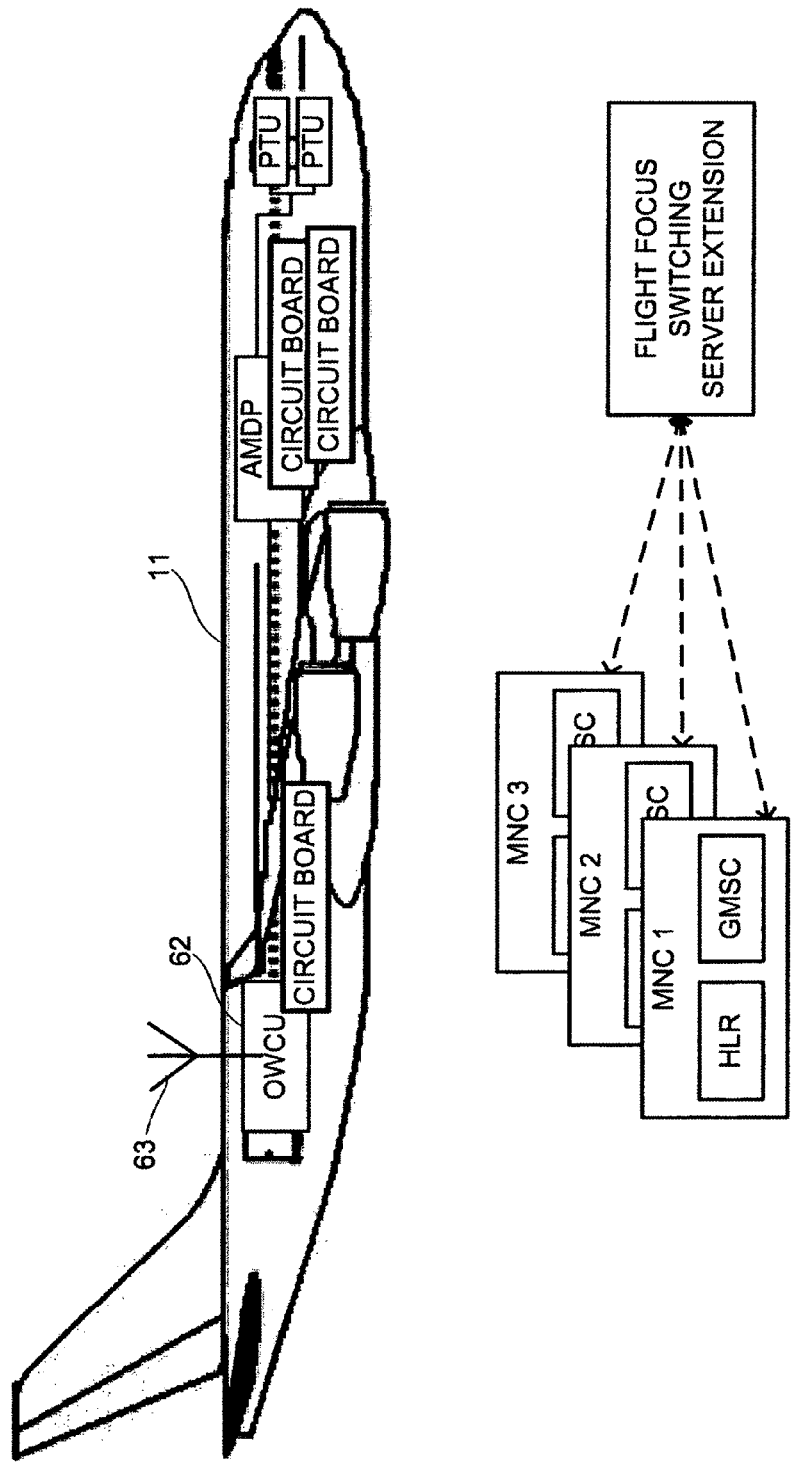
Figure 6:
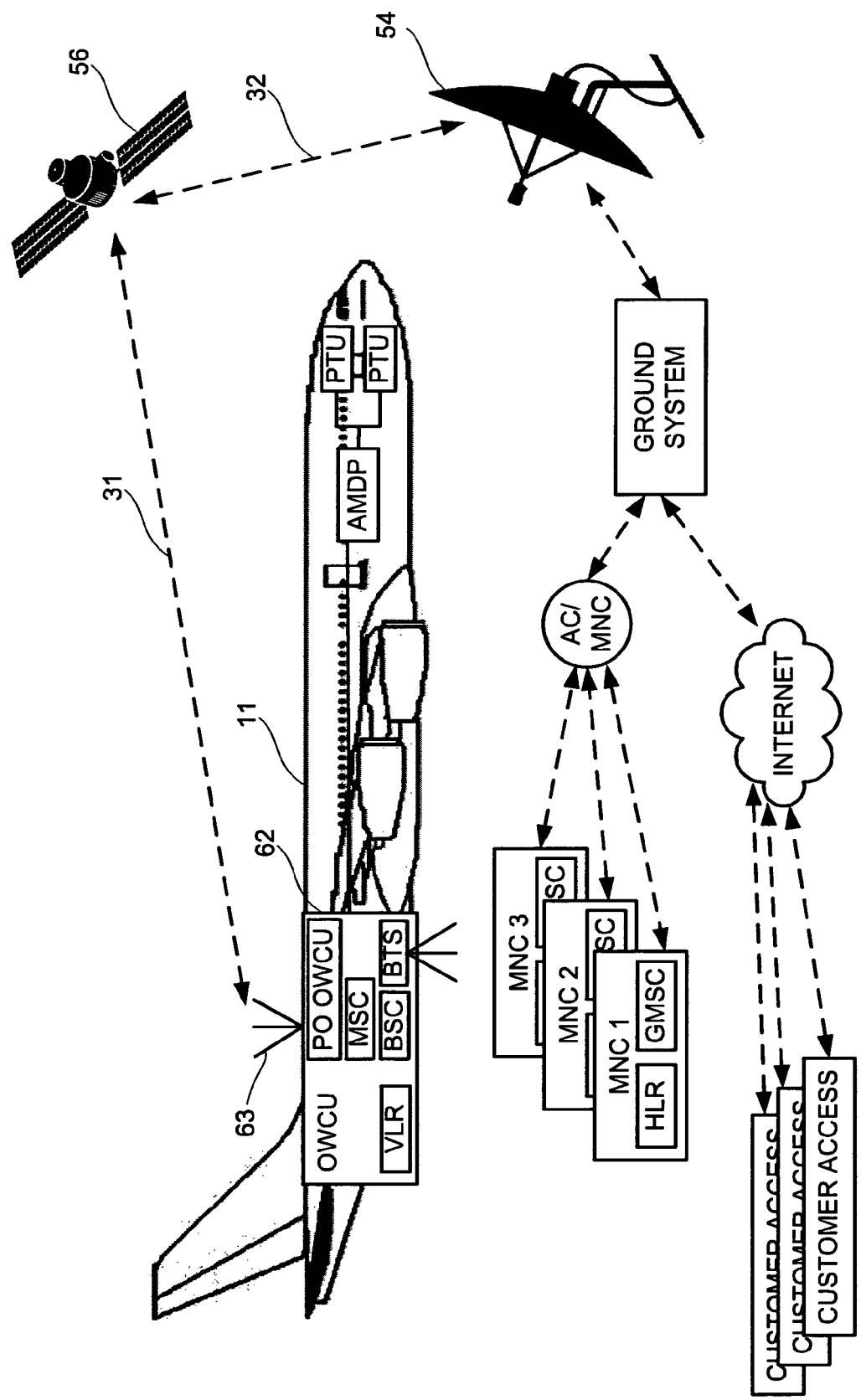
Figure 7:
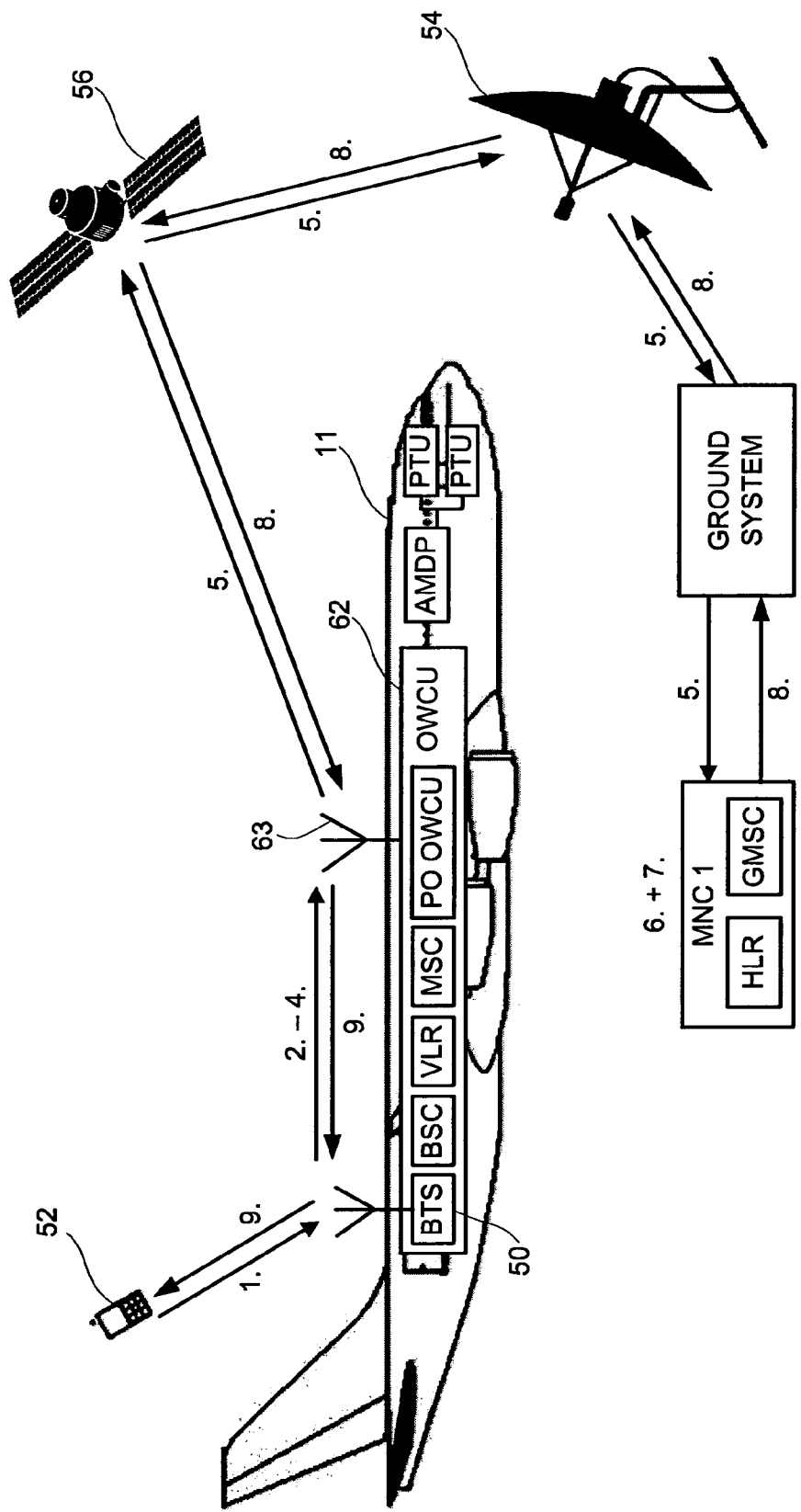
Figure 8:
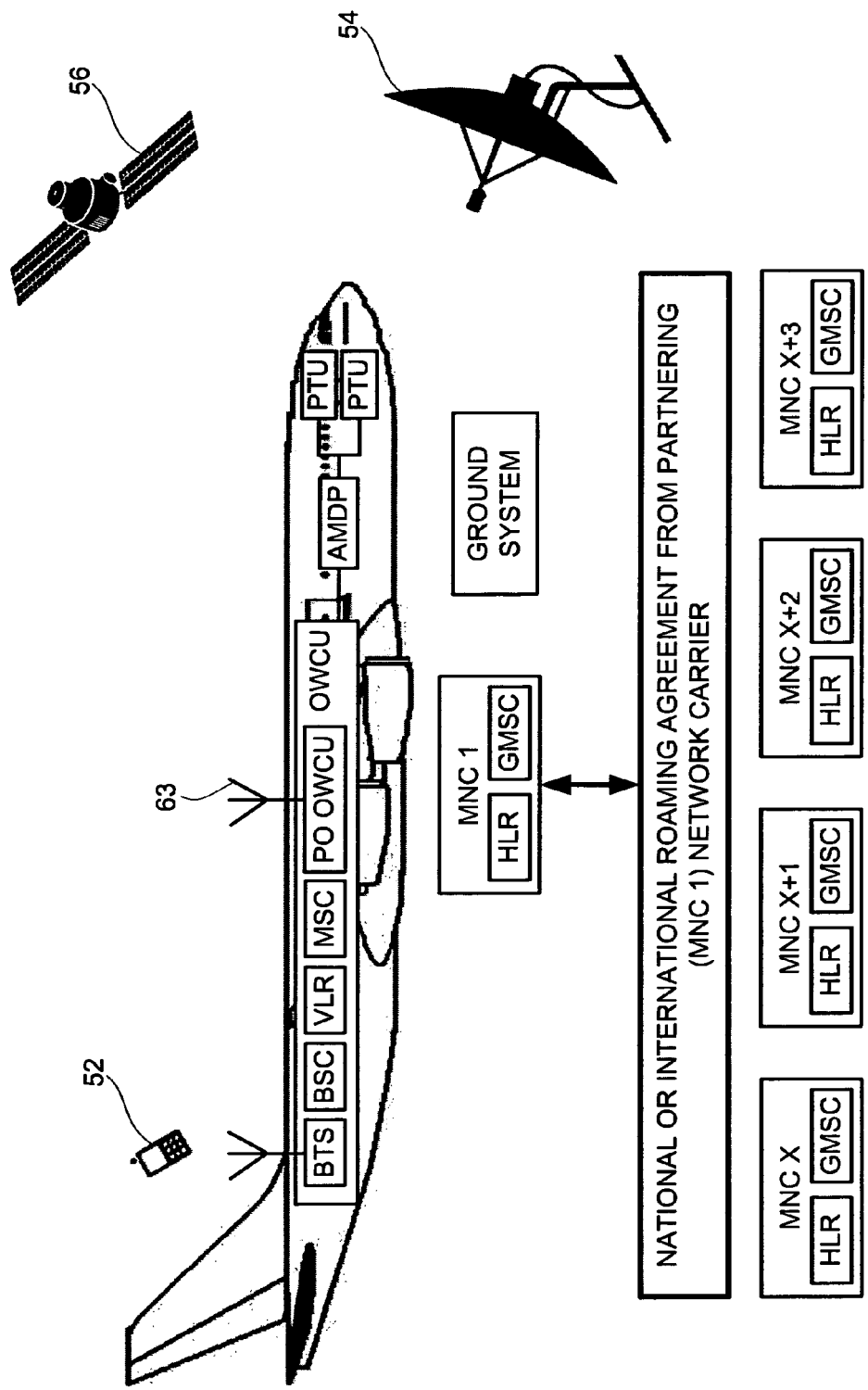
Figure 9:
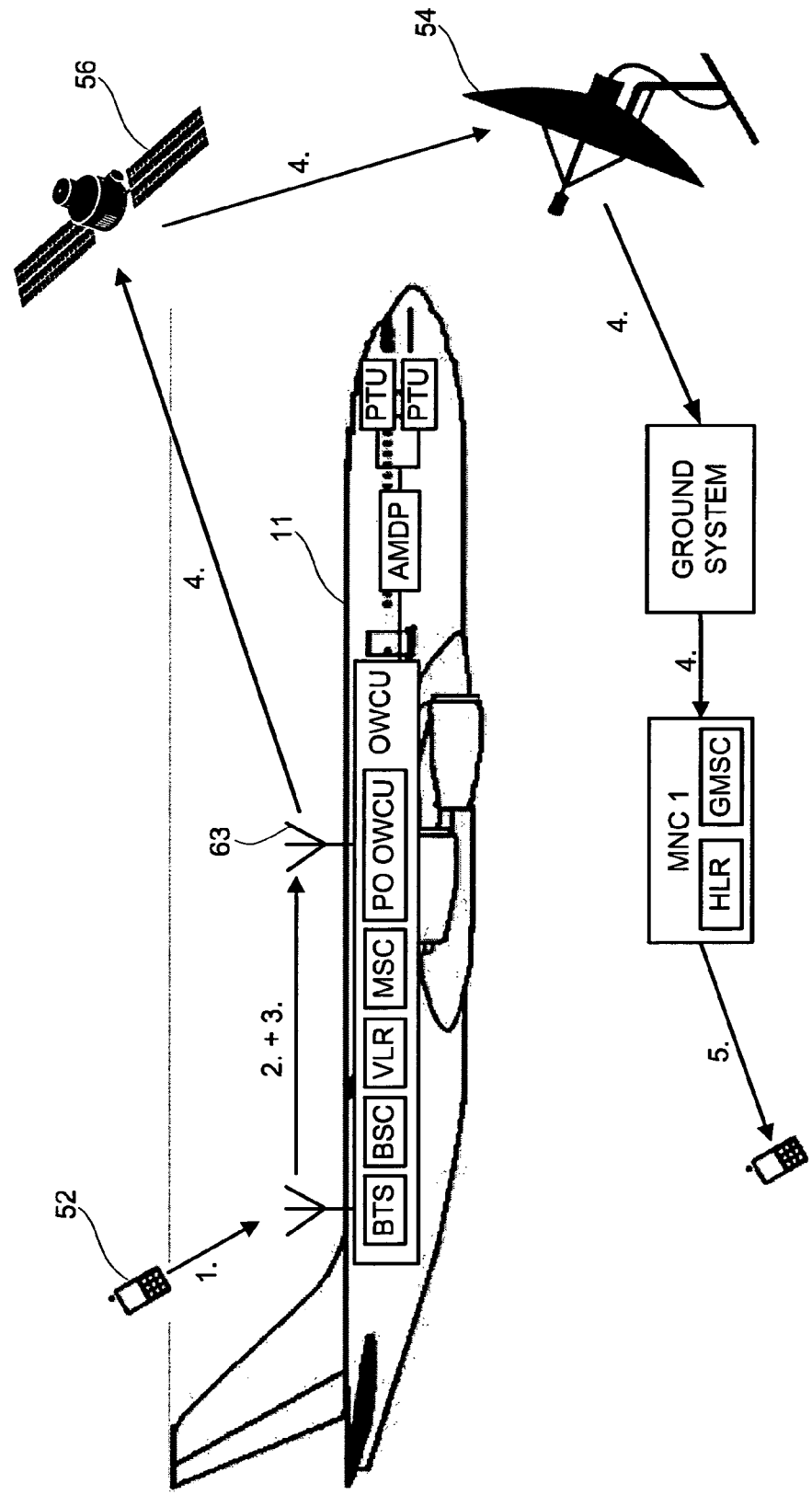
Figure 10:
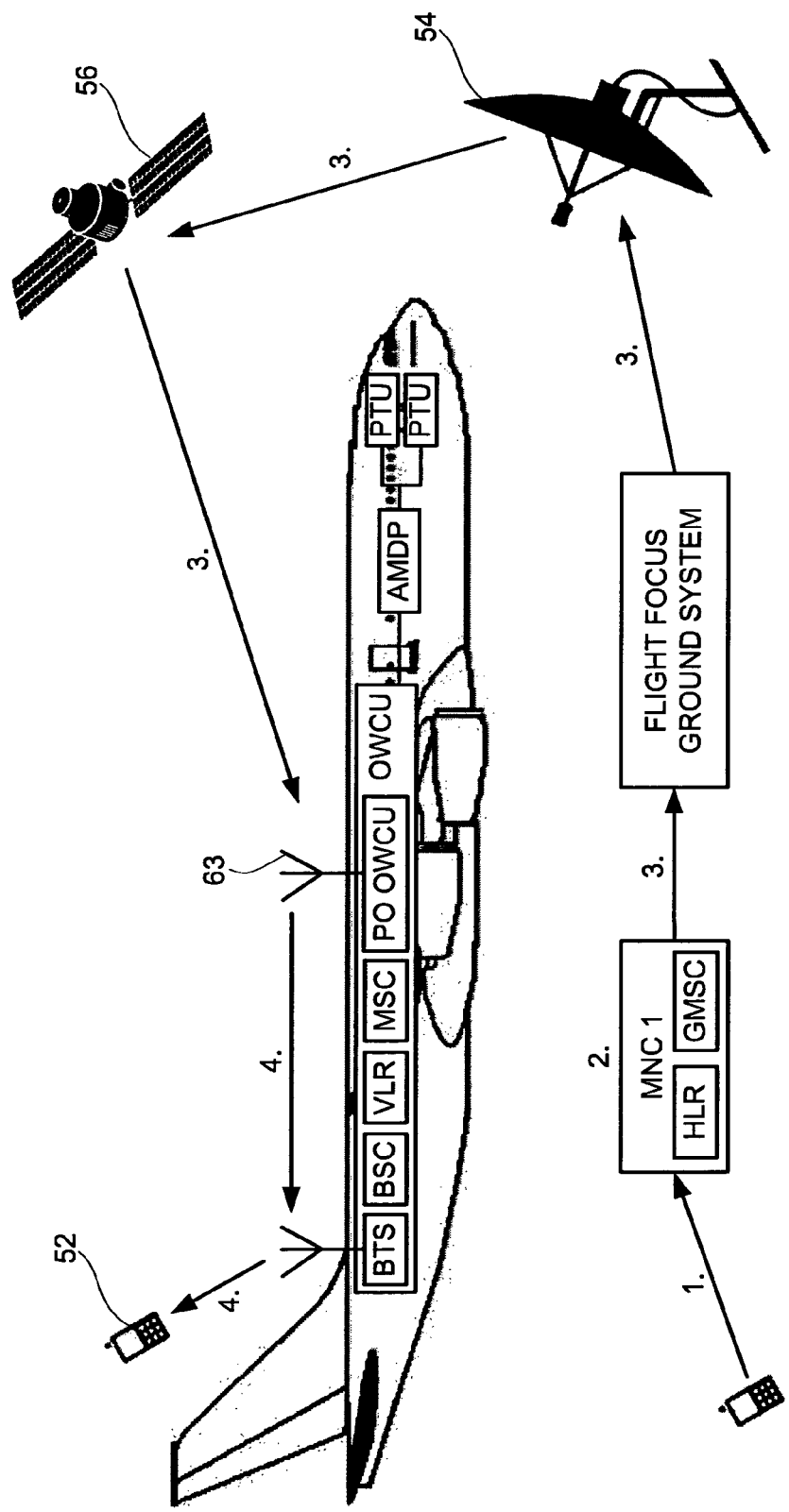

FIG. 1 illustrates an operational diagram of a flight information system 10,

FIG. 2 illustrates a transmission system for data transmission from and to mobile terminal units (MTUs) on an aircraft, FIG. 3 illustrate a second transmission system for data transmission from and to MTUs on an aircraft, FIG. 4 illustrates a third transmission system for data transmission from and to MTUs on an aircraft, FIG. 5 illustrates a second view of the transmission system of FIG. 4, FIG. 6 illustrates a third view of the transmission system of FIG. 4, FIG. 7 illustrates an authentication process of a cell phone using the transmission system of FIG. 4, FIG. 8 illustrates a cell phone roaming using the transmission system of FIG. 4, FIG. 9 illustrates sending of SMS from an MTU on an aircraft using the transmission system of FIG. 4, and FIG. 10 illustrates receiving of an SMS by an MTU on an aircraft.

DETAILED DESCRIPTION

In the following description, details are provided to describe the embodiments of the application (invention). It shall be apparent to one skilled in the art, however, that the embodiments may be practised without such details.

FIG. 1 shows an operational diagram of a flight information system 10.

The flight information system 10 comprises airborne components of the flight information system 10 which are provided on the aircraft 11. The airborne components include, among others, one or more displays, a main computer, means for communication and data exchange and on board applications and data which are stored on a computer readable medium.

A first portion 31 of a satellite communication channel 12 connects the airborne components of the flight information system 10 to the satellite 27. A second portion 32 of the satellite communication channel 12 is provided between a service provider's data center 33 and the satellite 27. The connection between the service provider's data center 33 and the satellite 27 may involve intermediate nodes, for example of an aeronautical telecommunication network, which are not shown in FIG. 1.

The service provider's data center 33 is connected to an operations support center 34. Airport communication channels 36 are provided between the service provider's data center 33 and airports 35, 36. The airport communication channels 37 comprise a first secure connection 38 via a first data network 14. Airline communication channels 39 are provided between the service provider's data center 33 and airline offices 40. The airline communication channels 39 comprise a second secure connection 41 via a second data network 42.

Furthermore, a bluetooth communication channel 13 is provided between a transmitter at an airport 35, 36 and the aircraft 11. The bluetooth communication channel 13 serves to connect the aircraft 11 to the service provider's data center 33 via the airport communication channel 37 while the aircraft 11 is on ground.

FIG. 2 shows a system for transmitting data between a mobile terminal unit 52 in an aircraft 11 and a ground station. The ground station is connected to a network and to a GSM (global system for mobile communications) network.

A BTS (base transceiver station) 50 is provided within the aircraft 11. Mobile terminal units 52 on board of the aircraft 11 are connectable to the BTS 50 via an antenna 53 of the BTS 50. The BTS 50 comprises a switching module 51 which is connected to a transceiver on the aircraft 11, which is not shown. The switching module 51 comprises a protocol emulator that is not shown which emulates an interface to a cell phone protocol, such as Abis for GSM, with respect to the mobile terminal unit 52. Furthermore, the BTS 50 is connected to the main computer via a connection cable. The main computer comprises a text processing unit for modifying, inserting and replacing text of a data message.

An antenna 54 of a BSC (base station controller) 55 is connectable to the antenna of the aircraft 11 via a satellite communication link that comprises one ore more satellites 56, such as, for example a geostationary satellite or one or more satellites of a global satellite network. The BSC 55 comprises a switching unit 57. The switching unit 57 comprises an Abis emulator which is connected to MSCs (mobile services switching centers) 58. Furthermore, the BSC 55 is connected to a network 59, such as the internet.

In the alternative embodiment of FIG. 3, the BSC 55 is connected to the antenna 54 of the ground station via an IP backbone 60.

In the following, messages to the aircraft 11 will be referred to as "ingoing messages" and messages from the aircraft will be referred to as "outgoing messages".

The base transceiver station at the aircraft 11 and the base station controller at the ground station comprise dynamic lookup tables in a computer readable memory. Before a flight of the aircraft 11, the dynamic lookup tables are synchronized using passenger data from an airline office. By way of example, two dynamic lookup tables are shown below. The dynamic lookup tables may be stored as a single dynamic lookup table and will also be referred to as "the dynamic lookup table".

TABLE 1 lookup table for passenger data

| keyword | example code | meaning |
| --- | --- | --- |
| 490135-24-874165-5 | #A | IMEI of mobile device |
| 357977-03-8728315 | #B | IMEI of mobile device |
| 09-00-2B-00-00-04 0 | #C | MAC address of computer |
| dispatch@flightdispatch.com | #D | e-mail address |
| 0496978072656 | #E | telephone number |
|  | #21 | passenger number 21 |

TABLE 2 lookup-table for message template

| message template | example code |
| --- | --- |
| order taxi at destination for [n] persons | &1 |
| order wheelchair at destination | &2 |
| send predicted arrival time to [Telephone number] | &3 |
| book a train ticket to [destination] departing after [time] from [location] | &4 |

During a flight of the aircraft 11, the mobile terminal units 52 of the flight passengers send outgoing data messages to the base station controller 55 of the aircraft 11. Likewise, airborne components of the flight information system 10 transmit outgoing data messages to the base station controller 55. A data transformation unit transforms the outgoing data messages into processed data messages. The data transformation uses the dynamic lookup tables and is described in more detail below. The processed data messages are segmented into data packages and the data packages are transmitted to the satellite 27. The satellite 27 transmits the processed data packages to the antenna 54 of the ground station, either directly or via further satellites. The Abis emulator inside the BTS 50 emulates the Abis interface of the GSM protocol with respect to mobile terminal units 52 on board of the aircraft 11.

At the ground station, the base station controller reassembles the data packages into SMS messages. The BSC 55 uses the identifier of the passenger to look up the telephone number of the passenger in a dynamic lookup table and inserts the telephone number into the header of the SMS message. The SMS message is sent to the addressee of the message. If the BSC 55 recognizes an SMS message as template message, the template is converted into the original SMS message with the aid of the dynamic lookup-table. For example, the message "&1 [2]" from table 2 is reconverted into: "Order a taxi for 2 persons to terminal 3 of London Heathrow airport." The BSC 55 uses the passenger identifier which is contained in the processed SMS message to look up the terminal and destination airport. Alternatively, a flight identifier, which is contained in the processed SMS message, may be used. The telephone number of the sender is reinserted into the SMS message and the SMS message is sent to the addressee of the message.

According to an alternative embodiment, the data packets are first routed to the service provider's data center 33 via TCP/IP. The data packets are then reassembled to SMS messages at the service providers data center 33 and are sent to the recipient. The service provider's data center 33 transmits the SMS message via a transmitter or uses an internet service to route the SMS message to a transmitter which is closer to the recipient. In this embodiment, the BSC 55 is located at the service provider's data center 33.

When the passenger gets on the flight, the BSC 55 on the ground is notified and the BSC 55 signals to the cell phone net that the passengers mobile terminal unit 52 is currently at the location of the BSC 55. While the passenger is on the plane, the BSC 55 answers location requests from the cell phone net to the passengers mobile terminal unit 52. When the passenger leaves the plane, the BSC 55 on the ground is again notified and the BSC 55 stops the emulation of the passengers mobile terminal unit 52 via the Abis interface.

If a caller on the ground wants to send an SMS to a passenger, the caller sends the SMS to the passengers mobile number, as usual. Since the location of the passenger's mobile terminal is registered with the cell phone net, the SMS is routed to the BSC 55. A data transformation unit of the BSC 55 transforms the ingoing data messages into processed data messages. The BSC 55 forwards the processed SMS messages which are destined for passengers on the aircraft 11 to the ground station of the global satellite network. At the ground station of the global satellite network, the SMS messages are collected in a message queue.

If the satellite 27 receives a request from the aircraft 11 to send outstanding text messages, the satellite 27 forwards the request to the ground station. A computer at the ground station reads out the message queue and transmits the processed data messages to the aircraft 11 via the satellite 27.

On board of the aircraft, the data packets from the satellite 27 are reassembled to processed SMS messages. The BTS 50 then converts the processed SMS messages back into the original SMS messages by using the dynamic lookup-table. The BTS 50 then forwards the original SMS messages to the mobile terminal units 52 of the passengers.

The SMS messages comprise free text SMS messages and template SMS messages. The processing of the template SMS messages comprises a transformation of the original SMS template messages using a meta language. The meta language comprises definitions and rules which define the transformation of a data message into a transformed message. The definitions and rules of the meta language define furthermore the reverse transformation of the transformed message into the original data message.

The transformation a data message comprises a text substitution of text based data content of the data message. The text substitution is based on dynamic lookup tables which are updated for each mission of the aircraft 11. The dynamic lookup tables are stored in a data storage medium of a computer onboard the aircraft 11 and in a data storage medium of a computer at the service provider's data center 33, respectively.

Furthermore, a passenger identifier is added to a header of an SMS message. A link to a data set which is associated to the passenger is stored in the respective lookup-table at the aircraft and on the ground. Alternatively or in addition, passenger related data is encoded by a code and included into the SMS message by adding it to a message header or by substituting the corresponding value for the code word. The receiving BSC 55 on the aircraft and the receiving BTS 50 on the ground look up the associated data set or the encoded data fields and reinsert the original data or initiate an appropriate action such as sending an outgoing SMS to a destination number and including the passenger's number in the header of the SMS.

Furthermore, the processing of the data messages comprises an insertion of additional flight and aircraft related information such as a destination address of an aircraft 11, encryption of the data message via an encryption procedure such as public key encryption and compression via a binary compression algorithm such as ZIP.

FIG. 4 shows a further embodiment of a data transmission system. A transceiver 63, which is connected to an onboard wireless communication unit (OWCU) 62 on an aircraft 11, is connectable to a satellite 56 via a first data link 31. A transceiver antenna 54 on the ground is connectable to the satellite 56 via a second data link 32. The transceiver antenna 54 is connected to a ground system 65, either via a direct connection, such as cable or beam radio or via a further network such as the PSTN. Costumer devices 64 on the ground are connectable to the ground system 65 via an internet connection 59.

Inside the aircraft 11, a computer of an advanced mission display system (AMDP) 67 is connected to the OWCU 62. Pilot terminal units 68 and 69 are connected to the AMDP 67 and are also interconnected. An onboard antenna is connected to the OWCU 62, which is not shown in FIG. 4.

FIG. 5 shows further details of the transmission system of FIG. 4. At the OWCU a circuit board is provided. The circuit board handles the emulation of the mobile protocol and further functions (Advantage: faster than executable program). Likewise, for each of the two pilot terminal units, a circuit board is provided as part of the computer of the advanced mission display system. A base transceiver station, which is not shown in FIG. 5, is connected to a leaky line antenna which extends above part or all of the passenger seats.

On the ground a switching server extension is provided which handles the emulation of the mobile phone protocol on the ground and the text substitution process. The corresponding switching server is also referred to as "extended switching server".

FIG. 6 shows further details of the transmission system of FIG. 4. The onboard wireless control unit 62 according to the invention contains a wireless control unit as well as base transceiver station (BTS), a base control station (BCS), a mobile switching center (MSC) and a visited location record (VLR) table.

On the ground, GMNSCs of various mobile network carriers are connectable to the ground system via further mobile network carriers or via AC. Furthermore, customers such as airlines, information providers and airports are connectable to the ground system via internet FIG. 7 shows a logon process of a mobile phone 52 at an onboard wireless communication unit. If a passenger enters into the aircraft with a switched on mobile phone or if the mobile phone is switched on for the first time, the mobile phone registers itself at the BTS 50 on board of the aircraft 11. The BTS 50 checks for a visited location record (VLR) entry in a stored VLR table. If no VLR entry exists, the BTS 50 request for authentication at a base station controller (BSC), which controls the BTS 50. Via the transceiver 63 and the satellite 56, the BSC forwards a registration request to a gateway mobile switching center (GMSC). The GMSC uses the mobile phone's IMSI to look up the present home location in the HLR table.

If an HLR entry is found, the GMSC changes the HLR table accordingly. If an HLR entry is not found, it means that the network is not the home network of the mobile phone and the GMSC forwards the registration request to the home network using the country code and the mobile network number. If the authentication has been successful, the GMSC updates its VLR, retrieves the authentification information and transfers the authentification information to the MSC and the BSC updates its visited location record (VLR).

For reasons of clarity, in FIGS. 6 to 10 the transceiver antenna of the BTS 50 and the mobile phone 52 have been drawn outside of the plane, although they are actually located inside the plane.

FIG. 8 shows in detail, how a roaming of a mobile phone on the aircraft 11 is achieved. First, the flight focus data center forwards an outgoing message to a mobile network carrier MNC1 via the service provider's data center. If the mobile phones IMSI number is found in the HLR table of the MNC1, the message is handled by the MNC1. Otherwise, the MNC1 notifies all partnering networks MNCX-MNCX+n. If the IMSI number is not found in any of the HLR tables of the partnering networks, the call is rejected.

FIG. 9 shows an outgoing call of a mobile phone 52 on board the aircraft 11. If a passenger sends a message via the mobile phone 52, the BTS receives the message via the antenna of the BTS. The BTS routes the message to the BSC. The BSC forwards the message to a mobile switching center (MSC) on board of the plane. The mobile switching center transfers the message to the ground system via the antenna 63, the satellite 56 and the transceiver antenna 54 of the ground system. The ground system carries out a text substitution if necessary, and transfers the message to a GMSC of the home network MNC1 of the mobile phone 52. If a registration for roaming has not been carried out according to FIG. 8, a registration is attempted first. If the mobile phone is successfully registered, the MNC1 routes the message to the destination number.

FIG. 10 shows an ingoing call to a mobile phone 52 on board of the aircraft 11 and which has been registered previously according to FIG. 7. A mobile phone on the ground sends a message to a destination number on the plane. The message is forwarded to a GMSC of the home network of the mobile phone 52. As the mobile phone 52 was registered previously, the extended switching server is known to the GMSC in the home network of the mobile phone 52 and the message is forwarded to the extended switching server. The extended switching server forwards the message to the MSC on board of the plane via the ground system, the antenna 54 of the ground system and the satellite 56. The MSC on board of the plane forwards the message to the BSC and the BTS on board of the plane. The BTS transmits the message using the antenna of the BTS.

Further aspects of the application are provided by the below mentioned devices and methods.

The application discloses a message transmission device for transmitting an SMS message of a mobile device from an aircraft to a ground system. The message transmission device comprises an onboard antenna which is connected to a base transceiver station on board of the aircraft for receiving the SMS message from the mobile device and a means for forwarding the message to a mobile switching center on board of the aircraft. Furthermore, the message transmission device comprises a means for emulating status messages and for transferring the status messages to the mobile device.

According to the application through emulation of status messages message traffic from the aircraft to the ground is only required for the actual sending of the SMS message content. Furthermore, the time of sending the SMS message can be delayed, for example for collecting several SMS message before sending them together or for encoding the SMS messages before sending them, such that the amount of transmitted data is reduced.

Moreover, the message transmission device provides a splitter for splitting the message into data packets and means for transmitting the data packets to the ground system. The splitter may adjust the length of the data packets according to a maximum length of a short burst data service. An onboard signal generator for the short burst data service reduces the length of a signal if the length of the data packet is smaller than the maximum length of the short burst data service. Thereby, the transmission of redundant Bits is avoided.

In a further embodiment, the message transmission device comprises a computer readable memory for storing SMS messages to be sent to the ground station and means for checking a predetermined condition for sending the SMS messages. The predetermined condition may specify a time limit but it may also specify immediate sending without time delay. It may also specify that the sending may be delayed until the aircraft is on the ground, for example when the aircraft is already approaching an airport.

The message transmission device may furthermore comprise a jamming unit which is capable of emitting a broadband signal for masking mobile bands from terrestrial communication facilities. The jamming unit ensures that handsets use the minimum power necessary to reach the on-board base station. For example, it emits a broadband signal to mask all the mobile bands in order to block the reception of terrestrial GSM signals on-board the aircraft and in order to avoid any communication with base stations on the ground.

In a further aspect the application discloses a message reception device for receiving SMS messages of a mobile device from an aircraft to a ground system. The message reception device comprises means for receiving data packets and a means for assembling the data packets to an SMS message. Furthermore the message reception device comprises means for deriving a sender phone number from the SMS message and means for looking up a home network of the mobile phone. The phone number may, for example be derived from an identifier in the SMS message which corresponds to a dynamic lookup table at a ground based system.

Moreover the message reception device comprises means for reassembling the data packets to an SMS message and means for transferring the SMS message from the ground system to a home network of the mobile phone.

Similarly, the application discloses a method for transmitting an SMS message of a mobile device from an aircraft to a ground system. The SMS message is received from the mobile device via an onboard antenna which is connected to a base transceiver station on board of the aircraft. The message is forwarded to a mobile switching center on board of the aircraft. The message is split into data packets and transmitted the data packets to the ground system, for example via the antenna 63, the satellite 56 and the transceiver antenna 54 of the ground system. In a ground based system, a home network of the mobile phone is looked up, the data packets are reassembled to an SMS message and the SMS message is transferred from the ground system to a home network of the mobile phone.

Furthermore, the message for transmitting and SMS message may comprise collecting SMS messages in an onboard message cache and delaying the steps of splitting the messages into data packets and transmitting the data packets to the ground system until a predetermined condition is fulfilled. In this way, the cost of message transmission to the ground and/or the amount of transmitted data can be reduced.

Specifically, the predetermined condition may be provided by a time interval.

Furthermore, the method for transmitting an SMS message may comprise determining if a registration for roaming has been carried out for the mobile device and, if it is determined that no registration has been carried out for the mobile device, a registration for roaming for the mobile device is attempted. If the registration for roaming is successful the SMS message is routed to a destination number, or, more precisely, to a device which corresponds to the destination number.

In a further aspect, the application discloses a method for transmitting an SMS message from an aircraft to a ground-based system. An interface of a cell phone net is emulated by using a base transceiver station on board of an aircraft. An SMS message is received from a passenger's mobile terminal unit and the SMS message is processed. Therein, the passenger's mobile terminal unit number is used to look up a passenger identifier in a dynamic lookup table. The header of the SMS message is replaced with a data header which comprises a passenger identifier. The processed SMS message is sent to a satellite of a satellite network. The processed SMS message from the provider of the satellite network and forwarded to a ground based system. At the ground based system the passenger identifier is used to look up the passenger's mobile terminal unit number and an SMS header which comprises the passenger's mobile terminal unit number is formed. Furthermore, an SMS message is derived from the SMS header and the processed SMS message and the SMS message is sent to a recipient.

Furthermore, the application discloses a method for transmitting an SMS message from a ground system to an aircraft. An interface of a cell phone net with a base station controller is emulated. An SMS message which is addressed to a passenger's mobile terminal unit is received and the SMS message is processed. Therein, the passenger's mobile terminal unit number is used to look up a passenger identifier in a dynamic lookup table. The header of the SMS message is replaced with a data header which comprises a passenger identifier. The processed SMS message is sent to a provider of a satellite network and the processed SMS message is forward to a satellite of the satellite network. The SMS message is received from a satellite of the satellite network by an aircraft antenna. At the aircraft, the passenger identifier is used to look up the passenger's mobile terminal unit number in a dynamic lookup table. An SMS header is formed which comprises the passenger's mobile terminal unit number and an SMS message is derived from the SMS header and the processed SMS message. The SMS message is sent to the passenger's mobile terminal unit.

Advantageously, the method also comprises a step of synchronizing the dynamic lookup table at the aircraft with a dynamic lookup table at the ground before the aircraft starts a new flight mission.

Specifically, the synchronization of the lookup tables further may comprise receiving passenger related data from an airline office and generating the dynamic lookup table at the ground using the passenger related data.

Furthermore, the dynamic lookup table may comprise an entry with at least a passenger ID and the passenger's mobile terminal unit number, which allows to replace the number with an ID that is shorter than the number. The dynamic lookup table may further more comprise further passenger related data or a link to that data. These data can then also be represented by identifiers whereby the length of the message is shortened.

According to the application, a dedicated channel of a global satellite network, such as Iridium, is used. This stands in contrast to the ACARS system in which the communication channels are shared. The use of a dedicated channel allows for a constant bandwidth and availability and makes it possible to use a proprietary protocol instead of the ARINC protocol.

Furthermore, the dedicated channel makes it possible to use a special service such as the Iridium short burst data service which is optimized for short text messages and is thus cheaper to use.

According to the application, data traffic between a mobile device and the ground is only required when data is transferred from and to the mobile device. Routine protocol messages are only sent between the mobile device and the BTS 50 on board of the aircraft 11 and between the BSC 55 and a cell phone network to which the BSC 55 is connected on the ground but not between the aircraft 11 and a ground station. The amount of data traffic is reduced and a service like the Iridium short burst data service, for which the cost is based on the transmitted bytes, may be used for the transfer of SMS messages.

A transmission system according to the application is capable of using any GSM frequency. For example, apart from the standard GSM at the 900 Mhz band it also supports DCS (digital cellular service) at the 1800 Mhz band and PCS (personal communication systems) at the 1900 Mhz band, as well as GSM at any other of the fourteen GSM frequency bands defined in the technical specification 3GPP TS 45.005. Interference problems can be reduced, because the minimum transmit power for GSM terminals at 1800 Mhz is lower than for GSM terminals at 900 Mhz.

The emulation of a cell phone net on board of the aircraft according to the application can also be used for further functionality which is based on the protocol of the mobile terminal unit 52, such as sending the mobile phone to sleep during start and landing phases.

Furthermore, the data capacity of the computer system on board the aircraft can be used to provide further SMS services to the passengers via a GSM terminal. For example a passenger might want to enquire, via a dedicated number, a price list of the goods on sale, the latest stock exchange rates or a price list of hotels at the destination airport.

Any information which is stored on board can be forwarded to the passengers, for example advertisements for special offers. Furthermore, the lookup table may be used to tailor the advertisements to the passenger. Messages between mobile phones on the aircraft can be forwarded free of charge.

The infrastructure of an existing flight information system can be used to provide a transmission system according to the application. The SMS messaging functionality can be provided by adding additional circuitry to an existing flight information system instead of fitting an additional LRU (line replaceable unit) into the aircraft, which is advantageous in terms of space and weight savings.

According to the application, the forwarding of the messages is not provided by a telecommunications satellite but by a switching center on the ground. A switching center of a partner telecommunications agency can be used, which is advantageous for reasons of cost efficiency and reliability.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practise. Thus, the scope of the embodiments should be determined by the claims and their equivalents, rather than by the examples given.

The invention claimed is:

1. Method for transmitting an SMS message from an airplane, the method comprising the steps of:
    emulating an interface of a cell phone net with a base transceiver station on board of an airplane,
    receiving an SMS message from a passenger's mobile terminal unit,
    processing the SMS message, the processing comprising
    using the passenger's mobile terminal unit number to look up a passenger identifier in a dynamic lookup table, and
    replacing the header of the SMS message with a data header, the data header comprising a passenger identifier,
    sending the processed SMS message to a satellite of a satellite network,
    receiving the processed SMS message from the provider of the satellite network,
    using the passenger identifier to look up the passenger's mobile terminal unit number,
    forming an SMS header which comprises the passenger's mobile terminal unit number,
    forming an SMS message from the SMS header and the processed SMS message, and
    sending the SMS message to an addressee.

2. Method for transmitting an SMS message to an airplane, the method comprising the steps of:
    emulating an interface of a cell phone net with a base station controller,
    receiving an SMS message which is addressed to a passenger's mobile terminal unit,
    processing the SMS message, the processing comprising
    using the passenger's mobile terminal unit number to look up a passenger identifier in a dynamic lookup table, and
    replacing the header of the SMS message with a data header, the data header comprising a passenger identifier,
    sending the processed SMS message to a provider of a satellite network,
    receiving the processed SMS message from a satellite of the satellite network,
    using the passenger identifier to look up the passenger's mobile terminal unit number,
    forming an SMS header which comprises the passenger's mobile terminal unit number,
    forming an SMS message from the SMS header and the processed SMS message, and
    sending the SMS message to the passenger's mobile terminal unit.

3. Method for transmitting an SMS message from an airplane according to claim 1, the method furthermore comprising
    collecting processed SMS messages of passengers, and
    after a predetermined time,
    sending the SMS messages in data bursts of a short burst data service.

4. Method for transmitting an SMS message from an airplane according to claim 1, the processing furthermore comprising
    identifying an SMS message as message template,
    replacing the SMS message by a template code,
    if data fields are present, and
    inserting the values of the data fields.

5. Method for transmitting an SMS message from an airplane according to claim 1, further comprising before the airplane starts a new flight, synchronizing the dynamic lookup table at the airplane with a dynamic lookup table at the ground.

6. Method for transmitting an SMS message from an airplane according to claim 5, the synchronization of the lookup tables further comprising
- receiving passenger related data from an airline office,
- generating the dynamic lookup table at the ground using the passenger related data.

7. Method for transmitting an SMS message from an airplane according to claim 1, wherein
- the dynamic lookup tables comprise an entry with a passenger ID and the passenger's mobile terminal unit number.

8. Method for transmitting an SMS message from an airplane according to claim 1, wherein
- the dynamic lookup tables comprise an entry with a passenger ID and a link to further passenger related data.

* * * * *